Figure 5:
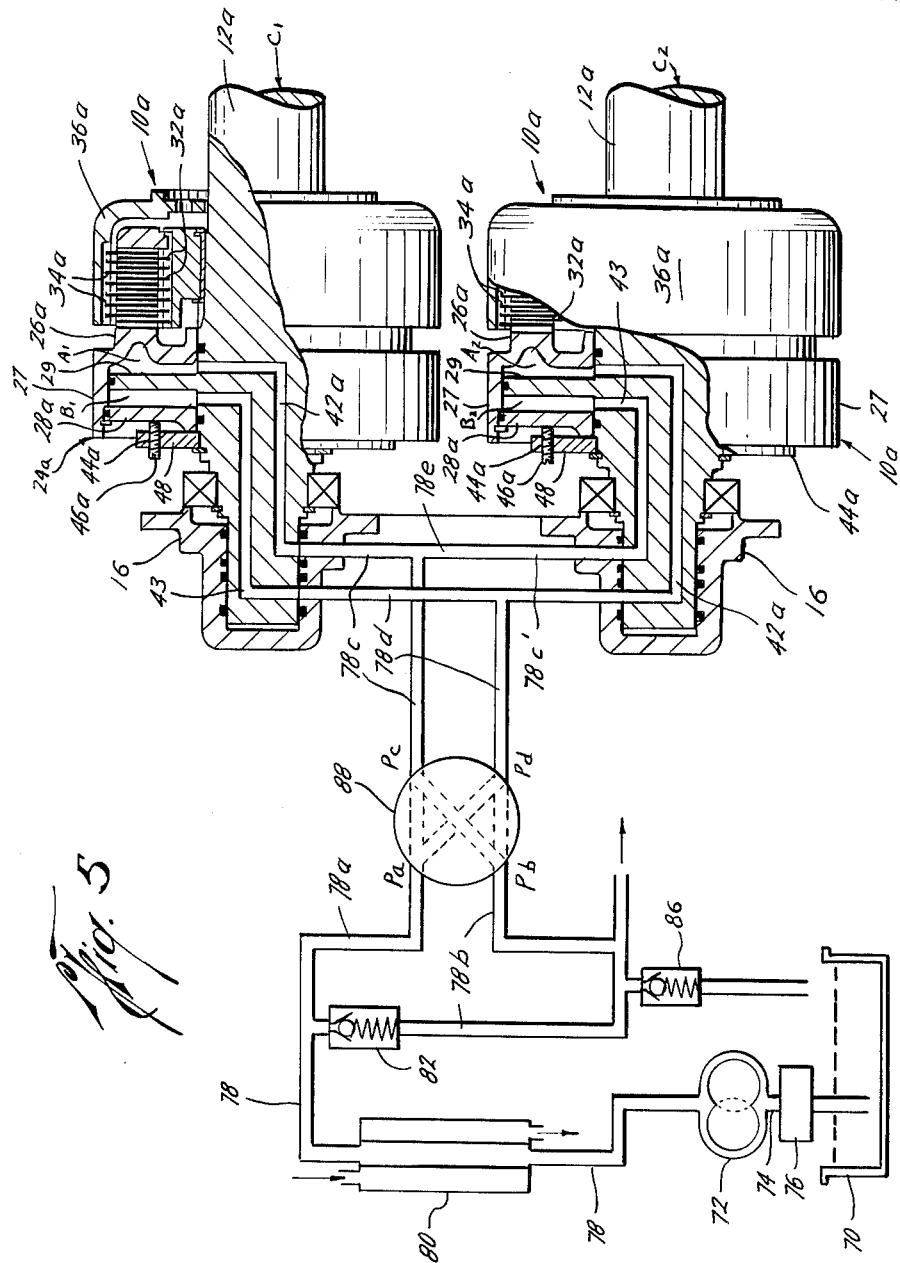

July 26, 1966  M. A. KRAMER  3,262,529
FLUID PRESSURE AND MECHANICALLY OPERATED CLUTCH
Filed Jan. 24, 1964  3 Sheets-Sheet 1
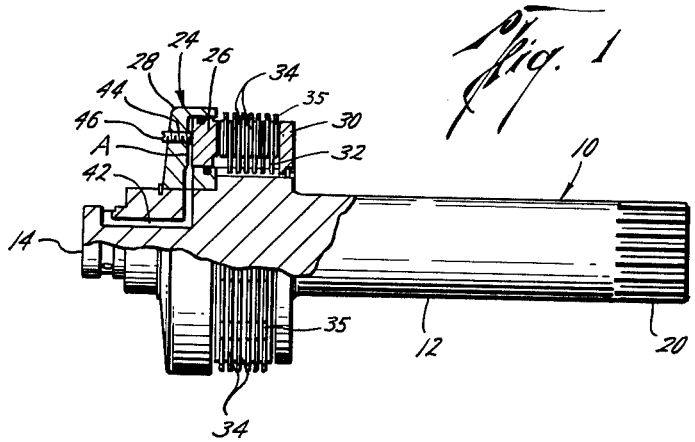
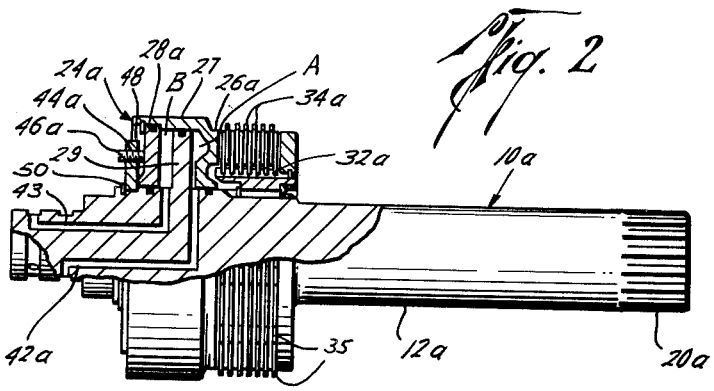
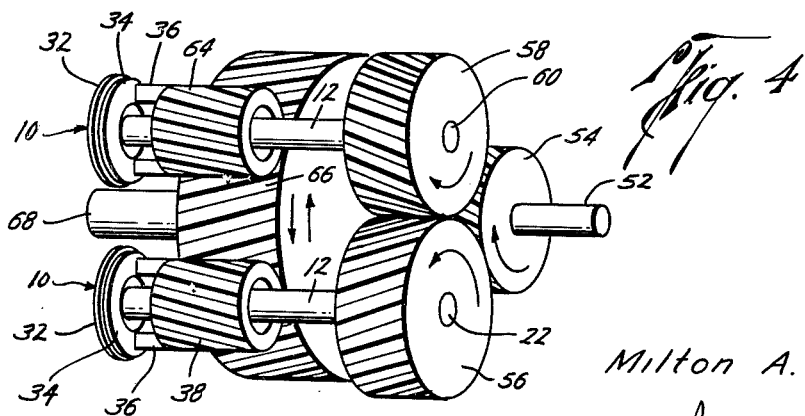
Milton A. Kramer
INVENTOR.

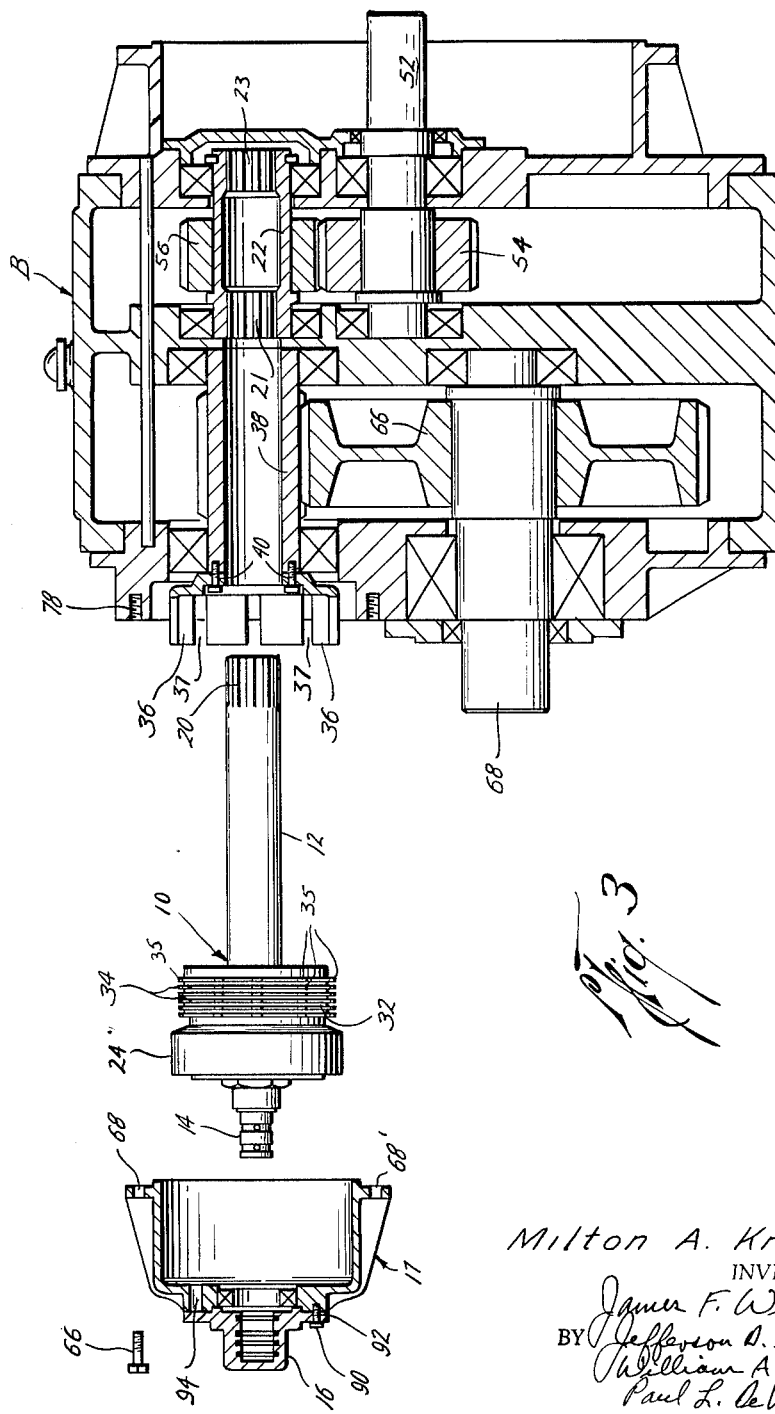

Milton A. Kramer
INVENTOR.

United States Patent Office 3,262,529
Patented July 26, 1966

3,262,529
FLUID PRESSURE AND MECHANICALLY OPERATED CLUTCH
Milton A. Kramer, Houston, Tex., assignor to Gulf Kramer Corporation, Houston, Tex., a corporation of Texas
Filed Jan. 24, 1964, Ser. No. 339,952
6 Claims. (Cl. 192—83)

The present invention relates to improved hydraulically operated clutch mechanisms.

Clutch mechanisms in rotative power systems find many varied applications between different prime movers and different types of driven equipment. As rotative power systems components improve and advance in technology, capacity and application, so do the functional demands of associated clutch mechanisms.

Inherent to all rotative power systems is the phenomenon of torsional vibrations. Under some circumstances torsional vibrations can become critical vibrations. Critical vibrations seriously affect, damage, or even destroy prime movers, power trains, or driven equipment. Although torsional vibrations cannot be eliminated, they can be controlled or rendered harmless (noncritical) by changing the natural frequency of the mass-elastic system, so that critical vibrations are eliminated or avoided within the normal operating speed range of the system.

It would be advantageous to provide a clutch assembly by which these can be controlled or rendered harmless, that is, noncritical, simply, readily and inexpensively.

It would also be highly advantageous to provide a unitized clutch pack assembly which may be mounted as a unit and which may be connected to and disconnected from a transmission readily, easily and expeditiously from outside the internal chambers of a transmission housing as a complete unit for either inspection, servicing or replacement.

It would also be highly advantageous to provide such a hydraulic clutch pack assembly having a hydraulic interlock circuit system which prevents simultaneous clutch engagement between all independent and opposing clutches in multiclutch power shift transmissions.

It would also be highly advantageous to provide such a unitized clutch mechanism which includes a readily available mechanical lockup for emergency operation in the event of hydraulic failure.

The present invention is directed to hydraulically operated clutch assemblies having one or more of the previously mentioned features.

It is therefore an object of the present invention to provide a hydraulically operated clutch mechanism which may be connected to and disconnected from a transmission as a unit readily, easily and expeditiously thereby facilitating assembly and disassembly of the clutch unit with respect to the transmission.

Yet a further object of the present invention is the provision of a unitized clutch and torsional drive shaft assembly, which unitized assembly is slidably and removably disposed in interfitting relationship with corresponding driving and driven components of power transmissions.

Yet a further object of the present invention is the provision of a unitized clutch and torsional drive shaft assembly, which shaft provides torsional flexibility or resiliency within a rotative power system which reduces and dampens harmful dynamic shock loads externally imposed upon the system.

Yet a further object of the present invention is the provision of a unitized clutch and torsional drive shaft assembly, which shaft is predetermined as to length and diameter before application so that the resulting natural frequency of the mass-elastic system optimumly eliminates or renders harmless critical vibrations within the normal operating speed range of the system.

Yet a further object of the present invention is the provision of a unitized torsionally resilient clutch assembly, the shaft of which provides practical means for altering the natural frequency of the mass-elastic system after application so that harmful critical vibrations found within the normal operating speed range are shifted to less critical positions, attenuated or optimumly, removed entirely from the normal operating speed range of the system.

Yet a further object of the present invention is the provision of a unitized torsionally resilient clutch assembly, whose apply force means is a hydraulically actuated mechanism disposed and axially displaceable about a torsionally resilient drive shaft.

Yet a further object of the present invention is the provision of a unitized torsionally resilient clutch assembly, whose apply force means is a hydraulically actuated double acting cylinder, disposed and axially displaceable about an axially stationary reaction piston, which provides two opposing pressure volumes which when selectively pressurized, engage or disengage the clutch driving and driven frictional elements.

Yet a further object of the present invention is the provision of a unitized hydraulic clutch assembly which when used in multiclutch power-shift or reversing transmissions, provides an independent hydraulic interlock circuitry system between all engagement and disengagement clutch pressure cavities to prevent simultaneous and overlapping engagement of all independent and opposing clutches in the transmission.

Yet a further object of the present invention is the provision of a hydraulically operated clutch means which includes mechanically actuated means for causing engagement of the clutch plates in the event of failure of the hydraulic system.

Yet a further object of the present invention is the provision of a hydraulically operated clutch mechanism which incorporates an exteriorly disposed and accessible mechanical clutch lockup means for mechanically engaging the clutch plates of the clutch mechanism in the event of failure of its hydraulic system.

Yet a further object of the present invention is the provision of a unitized clutch assembly that is compact, and of high capacity, that is relative to its size, and particularly small in diameter, so that the center distance between clutch lay shafts in side-by-side power shift transmission applications are a minimum.

A still further object of the present invention is the provision of an improved hydraulic clutch assembly for single disconnect and power shift multiclutch transmissions of the SAE flywheel housing mounted type in which one or all can be readily and quickly disengaged and removed as a complete assembly from an accessible end of the transmission, for example, the aft end, without disassembly of the transmission proper.

Yet a further object of the present invention is the provision of a clutch assembly which may be used both as a forward and reverse clutch and which is unitized so as to be readily and quickly disengaged and engaged with the transmission so that one clutch can be substituted for the other clutch should the other clutch mechanism fail or malfunction and when normal service and parts are unavailable.

Other and further objects, features and advantages will be apparent from the following description of a presently preferred embodiment thereof, given for the purpose of disclosure, and taken in conjunction with the accompanying drawings, in which like reference numerals designate like parts throughout the several views, and where FIGURE 1 is a side view, partly in section, illustrating a unitized hydraulic clutch assembly according to the invention, FIGURE 2 is a view similar to FIGURE 1 illustrating a modification, FIGURE 3 is a side view, partly in section, illustrating assembly of the unitized hydraulic clutch assembly of FIGURE 1 with a power transmission, FIGURE 4 is a schematic, perspective view illustrating the clutch assembly illustrated in FIGURES 1 and 3 in a transmission, and FIGURE 5 is a diagrammatic view illustrating a pair of unitized clutch assemblies illustrated in FIGURE 2 and a hydraulic system therefor.

Referring now to the drawings, and particularly to FIGURE 1, the reference numeral 10 generally designates a unitized, torsionally resilient clutch assembly, here shown as a single acting hydraulic force assembly, which includes generally the clutch torsion shaft 12 upon which all of the clutch elements are carried, what might be termed the outwardly extending end 14 of the clutch shaft being closed by the oil supply cover 16 (FIGURE 3) and the clutch cover 17. The other end 18 of the torsion clutch shaft 12 (FIGURE 1) is splined at 20 to slidably interfit with a counterbored, internally splined, gear shaft such as indicated at 22 in FIGURE 3.

Disposed on and carried by the torsion clutch shaft 12 is the piston and cylinder assembly 24 which includes the piston 26, the cylinder 28, the reaction plate 30, and the clutch driving plates 32 and driven plates 34, the clutch driving plates 32 being brought axially into engagement with the clutch driven plates 34 by application of hydraulic pressure against the piston 26 and disengaged by release of the hydraulic pressure and mechanical return springs, not shown.

Thus, the entire clutch assembly 10 is unitized and carried by the torsion shaft 12 and the clutch unit 10 is assembled by merely inserting the shaft 12 into the internally splined gear shaft 22 and the clutch cover 17 bolted or otherwise secured to the body of the transmission, as illustrated. The entire clutch assembly 10 is removed simply by removing the end cover 17 from the body of the transmission and withdrawing the clutch carried as a unit on the torsion shaft 12. Thus, the clutch unit is assembled with and removed from the power transmission readily, easily and quickly.

The length and diameter of the shaft and the modulus of elasticity of the material out of which the shaft is made, within the strength requirements, are factors which are considered in providing a clutch shaft of the desired torsional resiliency to avoid or attenuate critical or harmful vibrations. The length or diameter of the shaft or both can be varied before or after application, within limits, to provide the desired torsional resiliency. These variables are readily determined by torsional studies of the particular application or end use and may vary with various applications and uses of the unitized clutch assembly. Torsional analysis or studies are a separate art. Accordingly, no detailed description thereof is given or deemed necessary.

The piston and cylinder assembly 24 includes the piston 26 disposed within the cylinder 28, as previously mentioned, the piston 26 being movably disposed on the clutch torsion shaft 12. The driving plates 32 are splined to and rotate with the clutch shaft 12 and the driven plates 34 interfit in the gear clutch drum 36 (FIGURE 3) which is secured to the hollow pinion or gear 38 such as by the bolts 40 or other suitable means.

The cylinder 28 is fixed to the clutch shaft 12 and includes the apply force cavity or chamber A which communicates with the hydraulic passage 42 through which hydraulic force liquid and pressure is applied to and relieved from the force cavity A. Application of force pressure against the piston 26 engages the clutch plates 32 and 34 and release of pressure and mechanical spring returns disengage the plates in the normal manner.

No more details of the parts of the clutch as such are given since any type of clutch arrangement, actuating means, piston and cylinder assembly, spring returns and the like may be used.

For example, and with reference to FIGURE 2, where the reference letter "a" is added to numerals designating corresponding parts in FIGURE 1, a double-acting hydraulic force cylinder is illustrated. In this assembly a cylinder end wall 26a and cylinder 27 form the outer portions of a double-acting force cylinder for actuating the piston 29 which is rigidly secured to the clutch torsion shaft 12a and divides the force cavity of the cylinder 24a into an engaging apply force cavity A and a disengaging force cavity B. The hydraulic force passage 42a communicates with the engaging cavity A and the hydraulic force passage 43 communicates with and provides hydraulic force liquid to the disengaging force cavity B. Thus, application of hydraulic force liquid through passage 42a to force cavity A causes the piston 26a to move to the right, as the drawing is viewed, and engage the clutch plates 32a and 34a and application of hydraulic force liquid through the passage 43 into the force cavity B causes the piston 26a to move to the left thereby disengaging the clutch plates 32a and 34a in the normal manner.

While hubs, springs, seals, snap rings and the like are illustrated in FIGURES 1 and 2 for the purpose of illustrating complete assemblies, no reference numerals are assigned to these parts as they are conventional, may be varied, and, as such, do not constitute the present invention.

A readily accessible mechanical lockup is provided, however, in each of the clutch assemblies, so that the clutch plates 32 and 34 can be mechanically engaged and locked together when necessary. To this end, and referring first to FIGURE 1, a plurality of circumferentially spaced threaded holes 44 are provided (only one being shown) which threadedly receive the threaded bolts 46 which extend through the cylinder wall 28 and when screwed inwardly engage and move the piston 26 inwardly causing the clutch plates 32 and 34 to engage.

In FIGURE 2, to which reference is now made, the lockup bolts 46a, when screwed inwardly, engage the outer cylinder or plate member 28a which is rigidly secured to the return 27 of the piston 26a and thus causes the piston 26a to move inwardly and cause engagement of the clutch plates 32a and 34a. In this embodiment the circumferentially spaced threaded holes 44a (only one being shown) are provided in a separate lockup plate 48 rigidly secured to the clutch shaft 12a such as by the snap ring 50 or other suitable means.

Referring now to FIGURES 3 and 4, the clutch assembly 10 is illustrated in a typical gear type transmission. In this gear transmission a single input shaft 52 is connected to a drive pinion or gear 54 which meshes with and drives the high-speed forward gear 56 which, in turn, meshes with and drives the high-speed reverse gear 58 (FIGURE 4). The high-speed forward gear 56 is disposed on one end of the forward speed quill shaft 22 which is in splined interfitting engagement with the splined end 20 (FIGURE 3) of the clutch or torsion shaft 12 at 21 or 23, depending upon the length of the shaft 12.

Similarly, the high speed reverse gear 58 is mounted on and drives the reverse speed quill shaft 60 which is in splined interfitting engagement (not shown in FIGURE 3) with the splined end 20 of the clutch shaft 12 of another unitized clutch assembly identical with that previously described.

Thus, the forward speed gear 56 and the reverse speed gear 58 drive their respective clutch or torsion shafts 12 in forward and reverse directions.

Disposed about the forward clutch shaft 12 is the hollow pinion or gear 38 and disposed about the reverse speed clutch or torsion shaft 12 is the hollow pinion or gear 64, both of which permanently mesh with the bull or reduction gear 66 and drive the bull gear in either a forward or reverse direction upon actuation of their respective clutches 10.

Each clutch assembly 10 is connected to the transmission by the splined engagement of the torsion shaft 12 interfitting with the driving gear shaft 22 or 60, respectively, and the slidably interfitting engagement of the driven clutch plates with the clutch drum adapter 36. For this purpose the outwardly extending, circumferentially-spaced projections 35 are provided on the periphery of the driven clutch plates 34 which slidably fit in the slots 37 of the clutch drum adapter 36. Each clutch drum adapter 36 is connected to its pinion 38 and 64 by conventional means. Thus, upon engagement of the clutch plates 32 and 34 associated with either the forward rotating gear 56 and pinion 38 or the reverse rotating gear 58 and pinion 64, force is applied to rotate the bull gear 66 in either the forward or reverse direction respectively. The bull gear 66 in turn rotates the output shaft 68 accordingly.

No more description of the gear type transmission is thus deemed necessary or given, such a gear transmission being described in detail and claimed in our corresponding application, Serial No. 302,512, filed August 16, 1963, and as such, does not form a part of the present invention, although the arrangement and location of the clutch assemblies 10 provides important and significant advantages as set forth in our copending application.

Referring now to FIGURE 5, a pair of unitized clutch assemblies 10 provide important and significant advantageous side by side arrangement with a flow diagram illustrating a hydraulic interlock circuitry system for actuating these clutches. For convenience of reference the clutch assemblies 10a are indicated as $C_1$ and $C_2$.

A dual pressure hydraulic system 78 of sufficient capacity to provide both a high pressure force fluid circuit 78a and a low pressure lubrication fluid circuit 78b is diagrammatically illustrated. Within the system 78, a supply 70, a filter 76, a positive displacement pump 72, and a heat exchanger 80—all conventional elements—are provided. The apply force fluid for the high pressure circuit 78a is obtained by regulating the total system 78 capacity at the desired pressure by the high pressure regulator 82. System overage capacity from the high pressure circuit 78a is relieved through the regulator 82 to supply the low pressure lubrication circuit 78b its source of fluid. The low pressure circuit 78b is regulated to the desired lubrication pressure by the regulator 86. Overage low pressure circuit 78b capacity is relieved and returned to the supply 70 through the low pressure regulator 86, as illustrated.

While any desired pressure may be utilized in the high pressure apply force circuit 78a to engage the clutches, pressures of the order of 200-250 p.s.i.g. are satisfactory. Also, any lubrication pressure may be utilized but pressures of the order of 10 p.s.i.g. are satisfactory.

To direct high pressure force fluid and low pressure lubrication fluid into their desired circuits, a conventional four-way, three position selector valve 88 is included for this dual clutch application. As illustrated the high pressure circuit 78a is connected to the selector valve 88 at the inlet port Pa, the low pressure circuit 78b is connected to inlet port Pb. Outlet port Pc is connected to an interlocking circuit 78c which communicates with both the engaging force cavity $A_1$ of clutch $C_1$ and the disengaging force cavity $B_2$ of clutch $C_2$. In like manner, outlet port Pd is connected to an interlocking circuit 78d which communicates with both the engaging force cavity $A_2$ of clutch $C_2$ and the disengaging force cavity $B_1$ of clutch $C_1$.

Within the four-way three position selector valve 88, circuitry is such that in a first position, Pa communicates with Pc while Pb communicates with Pd. In a second position, all ports Pa, Pb, Pc and Pd communicate with each other. In a third position, Pa communicates with Pd and Pb with Pc.

With the selector valve 88 placed in the first position, high pressure force fluid from circuit 78a is simultaneously directed through circuit 78c into the engaging cavity $A_1$ of clutch $C_1$ and the disengaging cavity $B_2$ of clutch $C_2$ while low lubrication fluid from circuit 78b is directed through circuit 78d into both cavities $A_2$ and $B_1$. A net differential pressure exists across the reaction member 29 in both clutches between the high pressure force fluid and the low pressure lubrication fluid. In clutch $C_1$ this net differential pressure in $A_1$ and $B_1$ imparts an apply force to the piston 26a to engage the driving plates 32a and the driven plates 34a while in $A_2$ and $B_2$ of clutch $C_2$ there is simultaneously imparted an equal but opposite releasing force to the piston 26a to disengage its clutch plates.

In like but opposite manner, when the selector valve 88 is placed in the third position to engage clutch $C_2$, differential pressure in $A_2$ and $B_2$ engages the driving and driven plates of clutch $C_2$ while simultaneously disengaging plates of clutch $C_1$.

With the selector valve 88 placed in the second position, a neutral center position, all circuits communicate with each other through the open center circuitry of the selector valve. Pressure in all circuits is equalized at lubrication pressure by the low pressure regulator 86, the high pressure regulator 82 being by-passed.

Thus, clutch cavity pressures in both $A_1$ and $B_1$ and $A_2$ and $B_2$ are equalized at lubrication pressure. A fluid pressure balance results across the reaction member 29 imparting no hydraulic force against the piston 26a and conventional mechanical return springs, not shown, return both pistons to a neutral disengaged position.

Thus, any normal function, or malfunction of the hydraulic system 78 for its components, which would result in a differential pressure being applied to fully or only partially engage either clutch will result in an equal but opposite disengaging force being applied to the other opposing clutch in the transmission system. Thus, the hydraulic interlock prevents simultaneous or overlapping engagement of independent and opposing clutches, double acting clutches as described.

For convenience of disclosure, the clutches $C_1$ and $C_2$ are shown as being slightly different with respect to the passages 78c and 78d into the clutch cavities $A_1$ and $B_1$ of the clutch $C_1$ and $A_2$ and $B_2$ of the clutch $C_2$. If desired, the clutches $C_1$ and $C_2$ may be identical with appropriate connection of the hydraulic lines 78c and 78d.

As previously described, FIGURE 3 illustrates the ease, readiness and facility by which the unitized clutch assembly 10 is installed or removed from the transmission B. To install the unitized clutch assembly 10 in the transmission B, the splined end 20 of the torsional shaft 12 is moved into interfitting relationship with the drive shaft 22 at either 21 or 23, depending upon the length, diameter and desired torsional resiliency of the shaft, while simultaneously sliding the driven clutch plates into interfitting relationship with the clutch drum adapter 36, the circumferentially-spaced projections 35 slidably fitting within the slots 37 in the clutch drum adapter 36. Thus installed the assembly is retained and closed by placing the clutch cover assembly 17 over the clutch and securing it to the transmission housing B by a plurality of bolts 66. With hydraulic system circuitry lines, previously described, attached to the oil supply cover 16, the clutch is then ready for normal operation.

In the event it is desired to inspect, service or repair the clutch assembly the cover assembly 17 is simply removed by unthreading the bolts 66 in the openings 68 and 78 and removing the cover assembly 17. The entire unitized clutch assembly 10 is then removed for inspection, servicing, replacement of parts or replacement by another clutch assembly rapidly and easily. In this connection it is highly advantageous to be able to remove the clutch from a transmission in one assembly without having to disassemble a portion of the transmission itself. It is also advantageous to be able to connect the clutch assembly 10 to the transmission without having to disassemble and reassemble the transmission proper; that is, its gears, bearings and shafts. It is highly advantageous also to be able to readily remove the clutch unit for inspection, service, repair or replacement as such without the necessity of disconnecting the transmission or having to disconnect a portion of the transmission from its prime mover, as previously mentioned.

In the event the hydraulic system should fail for any reason, mechanical means are provided as previously mentioned to lock the clutch plates into driving engagement with one another. In the event of such a happening, and as best illustrated in FIGURE 3, the oil supply cover 16 is removed by unscrewing the bolts 90 in the threaded openings 92 and the bolts 46 and 46a (FIGURES 1 and 2) are screwed inwardly through access holes 94 in the cover 17 which causes the pistons 26 (FIGURE 1) and 26a (FIGURE 2) to move axially to the right which causes engagement of the clutch plates 32 and 34 as previously described. This mechanical locking of the plates together may be released by simply unscrewing the bolts 46 to permit release of the clutch plates.

As previously mentioned the clutch units are highly advantageous in those instances where either the forward- or reverse-speed clutch unit fails. In this event, the malfunctioning clutch unit is quickly removed from the transmission and the functioning clutch unit is also removed and reconnected at the location of the malfunctioning clutch unit.

The clutch units function in the normal manner of clutch units of this type. No more detailed description of the hydraulic actuation of the clutch unit is given or deemed necessary since the neutral phase, apply phase and release phase are conventional and normal for operation of gears of this type. In this connection, clutches of this general type are clutch assemblies such as illustrated in United States Patents Nos. 2,868,341, and 2,920,732, the present unitized clutch assembly constituting an improvement over clutches of the type disclosed in these patents.

As previously mentioned, the clutch assembly can be used with all types of power transmissions, for example, single disconnect, multiclutch power transmissions, reversing transmissions and the like. In multiclutch power shift transmissions, the valve 88, and the associated interlock hydraulic lines from it to the clutches, as previously described, prevent opposing clutches to be engaged at the same time.

Thus, the clutch assemblies of the present invention have many applications and uses.

The present invention, therefore, is well suited and adapted to attain the objects and ends and has the advantages and features mentioned as well as other inherent therein.

While presently preferred embodiments of the invention have been given for the purpose of disclosure, changes in arrangement of parts, details and the like will occur to those skilled in the art which are encompassed within the spirit of the invention as defined by the scope of the appended claims.

What is claimed is:
1. A hydraulic clutch assembly comprising,
   a rotatable clutch shaft,
   a fluid motor mounted on the clutch shaft,
   the fluid motor including a piston and cylinder, one of which is movable axially on the shaft upon actuation of the fluid motor,
   a plate in the fluid motor connected to and movable axially with said one of the piston and cylinder,
   engageable clutch plates carried on the clutch shaft, actuation of the fluid motor moving said one of the piston and the cylinder axially and engaging the clutch plates,
   a fixed abutment secured directly on the clutch shaft exteriorly of and adjacent to the plate, and
   mechanical means secured to the abutment and engaging the plate, actuation of the mechanical means moving the plate and thus said one of the piston and cylinder axially of the shaft and engaging the clutch plates.
2. The clutch assembly of claim 1 where the clutch shaft has a torsional resiliency which attenuates harmful vibrations.
3. A hydraulically operable clutch assembly comprising,
   a rotatable clutch shaft,
   a fluid motor mounted on the clutch shaft,
   the fluid motor including a piston and cylinder, one of which is movable axially thereon upon actuation of the fluid motor,
   the fluid motor including a plate carried by the shaft and axially movable with said one of the piston and cylinder,
   the clutch shaft arranged to be rotatably disposed through a gear drum adjacent one end of the clutch shaft, the gear drum connected to gearing of a gear transmission,
   engageable clutch plates carried by the clutch shaft, actuation of the fluid motor effecting movement of said one of the piston and cylinder axially and engaging the clutch plates,
   means at the one end of the clutch shaft for interconnection with drive means of the gear transmission,
   an abutment disposed about the clutch shaft exteriorly of and adjacent to the plate,
   mechanical means carried by the abutment and engaging the plate, actuation of the mechanical means moving the plate and thus said one of the piston and cylinder axially and bringing the clutch plates into engagement,
   means on the driven plates of the engageable clutch plates arranged to nonrotatably engage the gear drum for driving a driven member of the gear transmission, and
   housing means disposed about the other end of the clutch shaft for connecting the clutch assembly as a unit to the gear transmission.
4. The clutch assembly of claim 3 where the clutch shaft has a torsional resiliency which attenuates harmful vibrations.
5. A unitized hydraulically operable clutch assembly comprising,
   a rotatable clutch shaft,
   a fluid motor mounted on the clutch shaft,
   the fluid motor including a piston and cylinder, one of which is movable axially on the clutch shaft upon actuation of the fluid motor,
   the clutch shaft rotatably extending through a gear drive drum connected to gearing of a transmission disposed within a housing when assembled,
   engageable clutch plates carried on the clutch shaft, actuation of the fluid motor moving said one of the piston and cylinder thereby engaging and disengaging the clutch plates,
   mechanical means constructed and arranged to mechanically move said one of the cylinder and piston to engage the clutch plates,
   means at one end of the clutch shaft for interconnection with drive means of the gear transmission, and
   housing means disposed about the other end of the clutch shaft for connecting the clutch assembly as a unit to the gear transmission.

6. The clutch assembly of claim 5 where the clutch shaft has a torsional resiliency which attenuates harmful vibrations.

References Cited by the Examiner
UNITED STATES PATENTS

| | | | |
|---|---|---|---|
| 918,652 | 4/1909 | Bryan | 192—87 |
| 1,360,394 | 11/1920 | Gordon | 192—85 |
| 1,472,726 | 10/1923 | McLaughlin | 192—83 X |
| 2,511,520 | 6/1950 | Walton | 192—85 |
| 2,649,175 | 9/1953 | Stripling | 192—83 X |
| 2,981,391 | 4/1961 | Schultz | 192—85 |
| 2,990,928 | 7/1961 | King | 192—87 |
| 3,007,562 | 11/1961 | Aschaver | 192—86 X |
| 3,047,115 | 7/1962 | Lee et al. | 192—85 |
| 3,182,777 | 5/1965 | Browning et al. | 192—85 X |

DAVID J. WILLIAMOWSKY, *Primary Examiner.*

DON A. WAITE, *Examiner.*

B. W. WYCHE III, *Assistant Examiner.*